United States Patent [19]

Risk et al.

[11] 4,386,411

[45] May 31, 1983

[54] RANDOM PATTERN GENERATOR

[75] Inventors: Robert J. Risk, Malvern Link; Ian A. Shanks, Malvern, both of England

[73] Assignee: National Research Development Corporation, London, England

[21] Appl. No.: 221,268

[22] Filed: Dec. 30, 1980

[30] Foreign Application Priority Data

Jan. 8, 1980 [GB] United Kingdom ............... 8000520

[51] Int. Cl.³ ..................... G06F 15/20; G06F 3/14
[52] U.S. Cl. .................................. 364/521; 340/736; 358/101; 364/470
[58] Field of Search ............. 364/470, 521, 717, 718; 358/101; 340/146.32, 736, 743; 33/12, 14

[56] References Cited

U.S. PATENT DOCUMENTS

| | | | |
|---|---|---|---|
| 3,716,705 | 2/1973 | Newell .......................... | 364/521 X |
| 3,790,704 | 2/1974 | Collomosse et al. ............. | 358/101 X |
| 3,790,768 | 2/1974 | Chevalier et al. ................ | 364/717 |
| 4,078,253 | 3/1978 | Kajiura et al. .................. | 364/470 X |
| 4,257,042 | 3/1981 | Lindemann et al. ........... | 340/736 X |

*Primary Examiner*—Jerry Smith
*Attorney, Agent, or Firm*—Cushman, Darby & Cushman

[57] ABSTRACT

A random pattern generator is used to generate waveforms displayed on a cathode ray tube. A plurality of waveforms are built up to form an observed pattern for use in the design of textiles or carpets. To form a waveform a series of numbers $X_i$ ($i = 1, 2, 3 \ldots$) are generated each representing an amplitude value of a waveform X. Each value of $X_i$ is translated into a number Y in a series of numbers Z, then incremented by a changeable amount A to obtain a different value $Z_i$ which collectively are used to trace out a pattern on the cathode ray tube. The observed pattern changes with each value of A. Generation of $X_i$ and $Z_i$ may be from programmed read only memories. The series $Z_i$ may be a pseudo random sequence of numbers.

14 Claims, 4 Drawing Figures

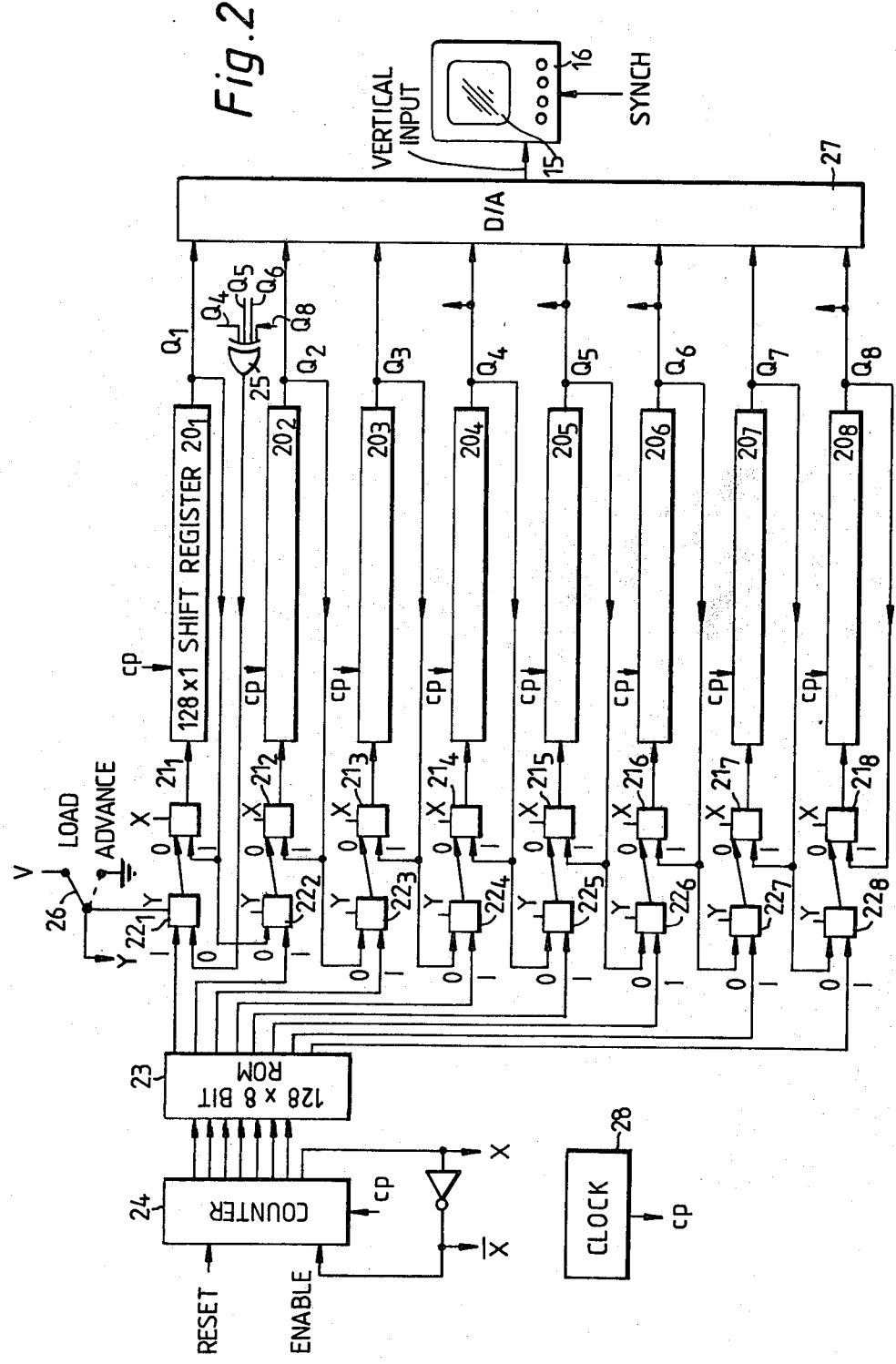

RANDOM PATTERN GENERATOR

This invention relates to random pattern generators.

Patterns are printed or woven into textiles and carpets, or printed onto paper for wall coverings. Such patterns comprise a basic pattern that may be repeated at intervals. Conventionally a designer sketches out patterns onto paper which is subsequently translated onto printing plates etc. The process of drawing out lines of pattern and colouring them is laborious and the production of an acceptable finished design on paper may take a week or more.

Considerable time could be saved by producing a series of outlines or traces onto the screen of a cathode ray tube, e.g. a television screen, and moving the traces relative to one another to produce a pattern, which is then recorded and used to produce printing plates etc.

One way of providing traces is to have banks of pre-set shapes and selecting from these a limited number at a time to display on the screen. Such a scheme provides only a limited and predictable choice of traces.

According to this invention a random pattern generator comprises means for generating a series of numbers $X_i$ each representing amplitude values of a waveform X, means for translating each value of $X_i$ into a number Y in a series of numbers Z, means for incrementing by a changeable amount each value of Y to obtain a different number $Z_i$ in the Z series, and means for using the successive values of $Z_i$ as a pattern trace, the arrangement being such that as the amount of incrementing is changed the pattern trace changes to a different pattern. (i=0, 1, 2, 3, ...)

The waveform X may be a waveform such as a sine-wave triangular wave or a pseudo-random sequence followed by itself reversed having reflection axis symmetry, or waveforms such as a sawtooth waveform with no such symmetry.

The means for generating amplitude values $X_i$ may be a read only memory arranged to output successive amplitude values when addressed by a counter.

The series Z may be partially or wholly a random or pseudo random sequence of numbers or formed by the combination of a series of Walsh functions etc.

The numbers $X_i$ may be used to address a read only memory programmed to read out the positional number $Y_i$ of $X_i$ in a pseudo random series Z. This positional value $Y_i$ for each $X_i$ is then incremented by adding a variable pre-set number A and the resultant number $Y_i + A$ used to address a further read only memory programmed to output a number $Z_i$ in the pseudo random sequence Z.

Alternatively the values $X_i$ may be entered into shift register and a modulo two feedback arrangement selectively applied to generate and increment pseudo random numbers. In modulo two feedback outputs between the first and the $N^{th}$ parallel output are connected via an exclusive OR or NOR gate to the serial input of the shift register.

The successive values of $Z_i$ may be converted into an analogue or video signal which is displayed on a cathode ray tube.

The invention will now be described, by way of example only with reference to the accompanying drawings of which:

FIGS. 2, 3, 4 are block diagrams showing generation of a random pattern using shift registers instead of the circuit of FIG. 1.

Figure 1:
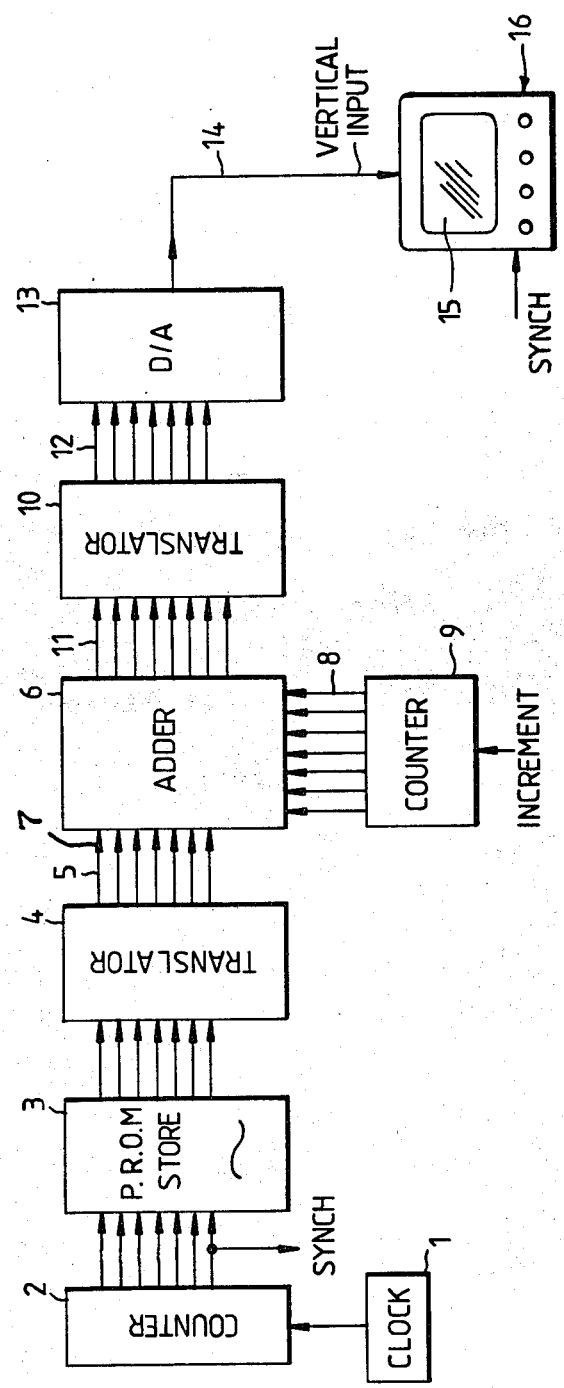
FIG. 1 is a block diagram showing generation of a single random pattern trace for display on a cathode ray oscilloscope.

As seen in FIG. 1 a clock 1 applies clocking pulses to a 8 bit counter 2 whose binary outputs 0 to 255 apply address pulses to a PROM (programmable read only memory), acting as a waveform store 3. This store 3 contains the successive amplitude values $X_i$ of a waveform such as one cycle of a sine wave in successive address positions. Output from the store 3 is a series of 8-bit binary numbers representing amplitude samples $X_i$, i being an integer, $0 \leq i \leq 255$. The most significant output of the counter 2 is also used to synchronise a cathode ray oscilloscope (CRO) 16.

A first translator 4 is a PROM and is programmed as detailed later. Address signals $X_i$ are received from the store 3 and the translators 4 eight outputs 5 are fed into an adder's 6 first set of inputs 7. A second set of inputs 8 to the adder 6 are received from a counter 9 which can be set to any number 0 to 254. Output from the adder 6 may have 9-bit numbers 0 to 509.

A second translator 10, also a PROM, is programmed the inverse of the first translator 4. The second translator 10 has 9-bit inputs 11 from the adder and 8-bit outputs 12 to a digital to analogue (D/A) converter 13 whose output 14 is displayed as vertical deflections on a cathode ray tube (CRT) 15 which is scanned horizontally by a suitable time base waveform generated in the CRO 16.

The value of $X_i$ may lie in the range $1 \leq X_i \leq 255$, the value zero is not used. The first translator 4 has store address position, Z where $1 \leq Z \leq 255$ (i.e. the same as $X_i$). Each store position has a number Y in the range $0 \leq Y \leq 254$ and Y is arranged in a pseudo random manner within the first translator i.e. $Y_i$ represents the position of $X_i$ in a pseudo random series Z.

Table 1 is a table of pseudo random numbers. The translator 4 is programmed so that address positions are given in column 2 and the corresponding stored number given in column 1. Thus input X of a number given in column 2 results in output of the corresponding number Y in column 1.

TABLE 1

| Column 1<br>Y or Y + A | Column 2<br>X or Z |
|---|---|
| 1 | 4 |
| 2 | 8 |
| 3 | 17 |
| 4 | 35 |
| 5 | 71 |
| 6 | 142 |
| 7 | 28 |
| 8 | 56 |
| 9 | 113 |
| 10 | 226 |
| 11 | 196 |
| 12 | 137 |
| 13 | 18 |
| 14 | 37 |
| 15 | 75 |
| 16 | 151 |
| 17 | 46 |
| 18 | 92 |
| 19 | 184 |
| 20 | 112 |
| 21 | 224 |
| 22 | 192 |
| 23 | 129 |
| 24 | 3 |
| 25 | 6 |
| 26 | 12 |
| 27 | 25 |

TABLE 1-continued

| Column 1<br>Y or Y + A | Column 2<br>X or Z |
|---|---|
| 28 | 50 |
| 29 | 100 |
| 30 | 201 |
| 31 | 146 |
| 32 | 36 |
| 33 | 73 |
| 34 | 147 |
| 35 | 38 |
| 36 | 77 |
| 37 | 155 |
| 38 | 55 |
| 39 | 110 |
| 40 | 220 |
| 41 | 185 |
| 42 | 114 |
| 43 | 228 |
| 44 | 200 |
| 45 | 144 |
| 46 | 32 |
| 47 | 65 |
| 48 | 130 |
| 49 | 5 |
| 50 | 10 |
| 51 | 21 |
| 52 | 43 |
| 53 | 86 |
| 54 | 173 |
| 55 | 91 |
| 56 | 182 |
| 57 | 109 |
| 58 | 218 |
| 59 | 181 |
| 60 | 107 |
| 61 | 214 |
| 62 | 172 |
| 63 | 89 |
| 64 | 178 |
| 65 | 101 |
| 66 | 203 |
| 67 | 150 |
| 68 | 44 |
| 69 | 88 |
| 70 | 176 |
| 71 | 97 |
| 72 | 195 |
| 73 | 135 |
| 74 | 15 |
| 75 | 31 |
| 76 | 62 |
| 77 | 125 |
| 78 | 251 |
| 79 | 246 |
| 80 | 237 |
| 81 | 219 |
| 82 | 183 |
| 83 | 111 |
| 84 | 222 |
| 85 | 189 |
| 86 | 122 |
| 87 | 245 |
| 88 | 235 |
| 89 | 215 |
| 90 | 174 |
| 91 | 93 |
| 92 | 186 |
| 93 | 116 |
| 94 | 232 |
| 95 | 209 |
| 96 | 162 |
| 97 | 68 |
| 98 | 136 |
| 99 | 16 |
| 100 | 33 |
| 101 | 67 |
| 102 | 134 |
| 103 | 13 |
| 104 | 27 |
| 105 | 54 |
| 106 | 108 |
| 107 | 216 |
| 108 | 177 |
| 109 | 99 |
| 110 | 199 |
| 111 | 143 |
| 112 | 30 |
| 113 | 60 |
| 114 | 121 |
| 115 | 243 |
| 116 | 231 |
| 117 | 206 |
| 118 | 156 |
| 119 | 57 |
| 120 | 115 |
| 121 | 230 |
| 122 | 204 |
| 123 | 152 |
| 124 | 49 |
| 125 | 98 |
| 126 | 197 |
| 127 | 139 |
| 128 | 22 |
| 129 | 45 |
| 130 | 90 |
| 131 | 180 |
| 132 | 105 |
| 133 | 210 |
| 134 | 164 |
| 135 | 72 |
| 136 | 145 |
| 137 | 34 |
| 138 | 69 |
| 139 | 138 |
| 140 | 20 |
| 141 | 41 |
| 142 | 82 |
| 143 | 165 |
| 144 | 74 |
| 145 | 149 |
| 146 | 42 |
| 147 | 84 |
| 148 | 169 |
| 149 | 83 |
| 150 | 167 |
| 151 | 78 |
| 152 | 157 |
| 153 | 59 |
| 154 | 119 |
| 155 | 238 |
| 156 | 221 |
| 157 | 187 |
| 158 | 118 |
| 159 | 236 |
| 160 | 217 |
| 161 | 179 |
| 162 | 103 |
| 163 | 207 |
| 164 | 158 |
| 165 | 61 |
| 166 | 123 |
| 167 | 247 |
| 168 | 239 |
| 169 | 223 |
| 170 | 191 |
| 171 | 126 |
| 172 | 253 |
| 173 | 250 |
| 174 | 244 |
| 175 | 233 |
| 176 | 211 |
| 177 | 166 |
| 178 | 76 |
| 179 | 153 |
| 180 | 51 |
| 181 | 102 |
| 182 | 205 |
| 183 | 154 |
| 184 | 53 |
| 185 | 106 |
| 186 | 212 |
| 187 | 168 |

TABLE 1-continued

| Column 1 Y or Y + A | Column 2 X or Z |
|---|---|
| 188 | 81 |
| 189 | 163 |
| 190 | 70 |
| 191 | 140 |
| 192 | 24 |
| 193 | 48 |
| 194 | 96 |
| 195 | 193 |
| 196 | 131 |
| 197 | 7 |
| 198 | 14 |
| 199 | 29 |
| 200 | 58 |
| 201 | 117 |
| 202 | 234 |
| 203 | 213 |
| 204 | 170 |
| 205 | 85 |
| 206 | 171 |
| 207 | 87 |
| 208 | 175 |
| 209 | 95 |
| 210 | 190 |
| 211 | 124 |
| 212 | 249 |
| 213 | 242 |
| 214 | 229 |
| 215 | 202 |
| 216 | 148 |
| 217 | 40 |
| 218 | 80 |
| 219 | 161 |
| 220 | 66 |
| 221 | 132 |
| 222 | 9 |
| 223 | 19 |
| 224 | 39 |
| 225 | 79 |
| 226 | 159 |
| 227 | 63 |
| 228 | 127 |
| 229 | 255 |
| 230 | 254 |
| 231 | 252 |
| 232 | 248 |
| 233 | 240 |
| 234 | 225 |
| 235 | 194 |
| 236 | 133 |
| 237 | 11 |
| 238 | 23 |
| 239 | 47 |
| 240 | 94 |
| 241 | 188 |
| 242 | 120 |
| 243 | 241 |
| 244 | 227 |
| 245 | 198 |
| 246 | 141 |
| 247 | 26 |
| 248 | 52 |
| 249 | 104 |
| 250 | 208 |
| 251 | 160 |
| 252 | 64 |
| 253 | 128 |
| 254 | 1 |
| 255 | 2 |
| 256 | 4 |
| 257 | 8 |
| 258 | 17 |
| 259 | 35 |
| . | . |
| . | . |
| . | . |
| . | . |
| 508 | 128 |
| 509 | 1 |
| 510 | 2 |

The counter 9 has output A where A is a binary number in the range $0 \leq A \leq 254$, and can be pre-set to output any number in this range. Thus the output from the adder 6 is $Y_i + A$ and is the 9-bit address number which is applied to the second translator 10. This is programmed the inverse of the first translator 4 namely each successive address position $Y + A$ corresponding to successive numbers in column 1 Table 1 has the contents Z as listed in column 2 Table 1. The sequence of Table 1 is repeated for $Y + A > 255$ so that $Z(Y+A) = Z(Y+A-255)$ if $Y + A > 255$.

In operation the clock 1 is set in operation to clock the counter 2 causing digital numbers $X_i$, representing successive amplitude sample values of a sine wave, to output from the waveform store 3. This repeats every 128 clock pulses.

At a moment in time the value of $X_i$ may be the binary number of 4. From Table 1 an input to the first translator 4 of binary 4 gives an output Y of binary 1.

If the value of A from counter 9 is set at zero then $Y + A$ is 1 and the output of the second translator 10 is the binary number 4 i.e. $X_i$ is unchanged. Thus for $A = 0$ the waveform in the store 3 is displayed on the CRT 15 without change.

However when the counter 9 is set so that A is for example 2 then for $X_i = 4$, $Y = 1$ from the first translator 4; $Y + A$ is 3 and from the second translator 10 Z is 17 which has a pseudo-random relation with $X_i = 4$. From the Table 1 it is seen that for $A = 2$, $X_i = 5$, $Z = 21$, etc. In effect Z from the second translator 10 is the number $X_i$ in column 2 of Table 1 incremented down column 2 by A lines. As a result the trace observed on the CRT 15 has a random relation to the generated, sine wave from store 3. This random relationship is changed by changing the value of A and hence changing the observed trace.

A pattern such as that which may be used on a carpet may be a collection of single traces and therefore several or many traces may be advantageously displayed on the CRT simultaneously. Thus the circuit of FIG. 1 may be repeated for as many traces as is desired. The number of traces displayed may be doubled by displaying each pattern trace and its inverted form. Each trace on the CRT may be adjusted for horizontal and vertical expansion and/or shift. Various patterns are thus observed by changing values of A and by trace adjustment on the CRO 16. In this manner an operator varies the observed pattern in an almost infinite variety of ways. When a pattern is judged aesthetically desirable it may be recorded e.g. by photographing the CRT 15 or by recording the information supplied to the CRT. In some instances the CRT may be a colour TV monitor. In this case the D/A convertor 13 is replaced by a digital to video convertor which brightens the TV raster at appropriate points along each TV line and generates the synchronisation pulses to achieve this.

Colour may be added to the background or to the observed pattern by assigning different colours to different parts of each trace, or its inverse and storing these in a random access memory (RAM) not shown. This may be achieved by use of a light pen or tracker ball and its associated electronics to interact with the display pattern using colours pre-selected from a colour chart. Texture effects may be produced by projecting one or more pattern images onto a roughened screen or blank textile or viewing a CRT through such a screen. Alternatively the luminance of the CRT may be modulated in a pseudo-random manner.

The code shown in Table 1 is a pseudo-random code. Other codes may be used, for example numbers based on Walsh functions or other complex functions.

Waveforms other than a sine waveform may be stored in the store 3, e.g. triangular waveforms, etc. Preferably the waveform has at least one reflection axis of symmetry, e.g. for a sine wave these axes are through the 90° and 270° points, since this imparts an amount of symmetry to the displayed trace. Other waveforms e.g. saw tooth, with no symmetry may also be used.

FIG. 2 shows a circuit for the generation of pseudo random codes. Eight serial in serial out 128 shift registers $20_1$ to $20_8$ each have their outputs $Q_1$ to $Q_8$ connected through the 1 terminal of first 2:1 multiplexers $21_1$ to $21_8$ to their inputs. The 0 terminal of the first multiplexers connect to the output of second multiplexers $22_{1-8}$. The 1 terminal of the second multiplexers $22_{1-8}$ connect to the outputs of an $8 \times 128$ BIT PROM acting as a waveform store 23 similar to that of FIG. 1. Addressing of the store 23 is by an 8-BIT counter 24. Outputs $Q_4$, $Q_5$, $Q_6$ and $Q_8$ from the shift registers $20_4$, $20_5$, $20_6$, $20_8$ are connected through an exclusive OR gate 25 to the 0 input of the multiplexer $22_1$. Outputs $Q_1$ to $Q_7$ connect through the 0 input to multiplexers $22_2$ to $22_8$ so that the shift registers $20_{1-8}$ may be connected head to tail.

Clock pulses cp are supplied by a clock 28 to the counter 24 and all shift registers $20_{1-8}$. The first multiplexers $21_{1-8}$ are controlled by a signal X applied from the 8th bit output of the counter 24; this 8th bit output also connects through an inverter to provide a signal $\overline{X}$ to the enable input of the counter 24. A switch 26 applies either zero or a voltage to the control input to the second multiplexers $22_{1-8}$ to respectively connect the registers head to tail or to the store 23. Outputs $Q_{1-8}$ from the shift registers $20_{1-8}$ are connected to a digital to analogue (D/A) converter 27 whose output is displayed as vertical deflections on the CRT 15 which is scanned horizontally by a suitable time base waveform generated in the CRO 16.

Figure 3:
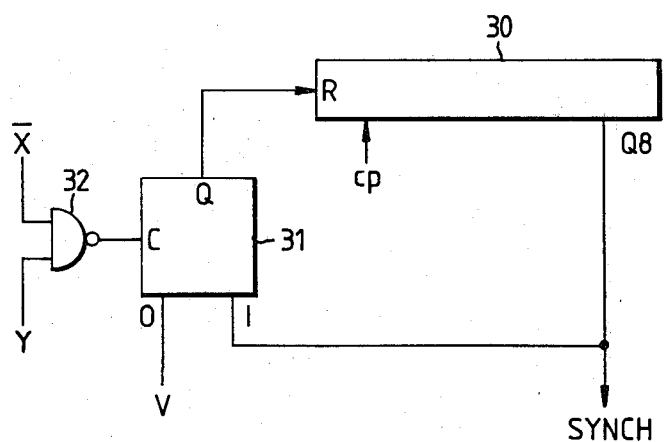

Synchronisation pulses for the CRO 16 are from the 8th bit output of an 8 bit counter 30, FIG. 3, clocked by the clock 28. The 8th bit output is connected through the 1 input of a 2:1 multiplexer 31 to the counter reset. A voltage V is applied to the 0 input of the multiplexer 31. A NAND gate 32 has inputs from $\overline{X}$ and Y and an output to the control c of the multiplexer 31.

Figure 4:
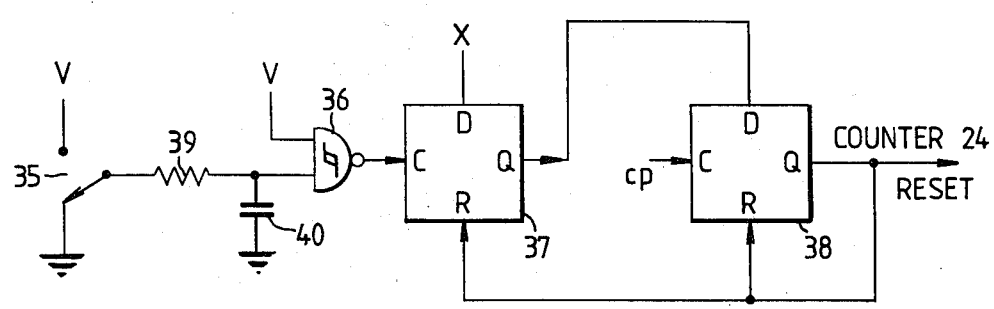

The counter 24 is reset by the circuit shown in FIG. 4. This comprises a push button switch 35 normally connected to earth but when depressed connects a voltage V through a Schmitt trigger NAND gate 36 to the clock input of a first flip flop 37. Output from the first flip flop is to the data input of a second flip flop 38 clocked by pulses cp from the clock 28. Output from the second flip flop 38 is to the counter 24 reset and to the reset of both flip flops 37, 38. Signal X is applied to the data input of the first flip flop 37. A resistor 39 and capacitor 40 are connected between the push button switch 35 and NAND gate 36 to prevent contact bounce.

In operation the switch 26 is set to load thereby connecting the second multiplexers $22_{1-8}$ outputs to the store 23. The push button 35 is pressed and released to reset counter 24 which is then clocked to address the store 23 programmed to give 128 8-bit binary output numbers representing the amplitude value of successive points on one cycle of a sine wave. Since the 8th bit output of the counter is zero the value of X is zero and the first multiplexers $21_{1-8}$ have their 0 input connected to the shift registers $20_{1-8}$. As a result 128, 8-bit numbers are clocked into the shift register $20_{1-8}$ from the store 23. After 128 clock pulses the 8th bit of the counter 24 goes to a logic 1 and the signal $\overline{X}$ stops the counter and the signal X changes the first multiplexers $21_{1-8}$ to recirculate the contents of each shift register $20_{1-8}$ within itself.

During the first 128 clock pulses cp after the button is pressed and released $\overline{X}$ and Y are logic 1 and so the counter 30 is held reset. When X goes to a logic 1, after 128 clock pulses, the reset signal to counter 30 is removed. This allows the counter 30 to give an output synch pulse to the CRO 16 after 128 clock pulses as it resets from its own 8th bit output until the counter 24 is reset to zero by again operating the push button 35.

The output of the D/A is observed on the CRT as a sine wave, or whatever shaped wave that is programmed into the store 23.

To obtain a pseudo-random set of numbers in the shift registers $20_{1-8}$ the switch 26 is set to advance and the push button switch 35 pressed and released one to cause a reset pulse, coinciding with the leading edge of a clock pulse, to reset the counter 24 to zero. This drops X to zero thereby connecting each shift register $20_{1-8}$ head to tail and outputs $Q_4$, $Q_5$, $Q_6$ and $Q_8$ through the exclusive OR gate 25 to the input of shift register $20_1$. During the next 128 clock pulses the numbers in the shift register are transformed pseudo-randomly into another set of numbers. On the 128th clock pulse the signal $\overline{X}$ stops the counter 24 and signal X goes to logic 1 and the shift registers $20_{1-8}$ are again reconnected to circulate their contents within themselves. The new numbers in the shift registers $20_{1-8}$ are displayed on the CRO 16 synchronised by the output $Q_8$ of the counter 30 until the push button switch is operated as above to again transform the set of numbers held in the shift registers $20_{1-8}$.

A total of 255 different transformations can be generated for each of the 128 numbers in the registers $20_{1-8}$. This figure arises because the length of a psuedo-random sequence of numbers (before the numbers repeat) is $2^N - 1$ and in the present example N=8 because 8-Bit numbers are used in the store 23 and the shift registers $20_{1-8}$.

We claim:
1. A random pattern generator for producing a pattern trace comprising means for generating a series of numbers $X_i$ each representing amplitude values of a waveform X, means for translating each value of $X_i$ into a number Y in a series of numbers Z, means for incrementing by a changeable amount each value of Y to obtain a different number $Z_i$ in the Z series, so that as the amount of incrementing is changed the pattern trace changes to a different pattern and means for using the successive values of $Z_i$ as said pattern trace.

2. A random pattern generator as claimed in claim 1 wherein the Z series is a random series of numbers.

3. A random pattern generator as claimed in claim 1 wherein the Z series is a pseudo random series of numbers.

4. A random pattern generator as claimed in claim 1 wherein the Z series is a series of Walsh functions.

5. A random pattern generator as claimed in any one of claims 1 to 4 including means for converting successive values of Zi to analogue values to form an analogue signal.

6. A random pattern generator as claimed in claim 5 including means for using the analogue signal to modulate the vertical deflection on a cathode ray tube.

7. A random pattern generator as claimed in claim 6 including a cathode ray tube for displaying the analogue signal and its inverse.

8. A random pattern generator as claimed in claim 7 wherein a plurality of different analogue signals are displayed on the cathode ray tube.

9. A random pattern generator as claimed in claim 8 including means for changing the shape of the waveform X.

10. A random pattern generator as claimed in claim 3 wherein the values of $X_i$ are held in shift registers and a modulo two feedback arrangement is selectively applied to generate and increment the pseudo random numbers $Z_i$.

11. A random pattern generator as claimed in claim 1 wherein the means for generating $X_i$ is a read only memory arranged to output successive amplitude values when addressed by a counter.

12. A random pattern generator as claimed in claim 1 wherein the means for translating each value of $X_i$ into a number Y is a read only memory.

13. A random pattern generator as claimed in claim 12 wherein the means for incrementing each value of Y is an adder having on input of values Y and a second input of values A from a counter.

14. A random pattern generator as claimed in claim 13 wherein the different numbers $Z_i$ are obtained from a read only memory addressed by the adder.

* * * * *